(12) United States Patent
Lee

(10) Patent No.: US 6,332,914 B1
(45) Date of Patent: Dec. 25, 2001

(54) METHOD AND APPARATUS FOR SEPARATION OF HEAVY AND TRITIATED WATER

(75) Inventor: Myung W. Lee, deceased, late of North Augusta, SC (US), by Younghi Shon Lee, Executrix

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/514,376

(22) Filed: Feb. 28, 2000

(51) Int. Cl.$^7$ .............................. B01D 59/12; B01D 53/22
(52) U.S. Cl. ..................... 95/55; 95/289; 96/4; 96/13; 96/221
(58) Field of Search .................... 95/43, 45, 46, 95/55, 56, 289; 96/4, 6, 11–13, 221

(56) References Cited

U.S. PATENT DOCUMENTS

| | | | |
|---|---|---|---|
| 2,585,244 | * | 2/1952 | Hanson ................................. 96/221 |
| 2,688,404 | * | 9/1954 | Wahl ................................. 96/221 X |
| 2,905,527 | * | 9/1959 | Dole ................................. 96/221 X |
| 3,337,051 | * | 8/1967 | Kerschner et al. ................. 96/221 X |
| 4,707,342 | * | 11/1987 | Iniotakis et al. ..................... 95/55 X |
| 5,122,163 | * | 6/1992 | Ide et al. ............................ 96/221 X |
| 5,888,273 | * | 3/1999 | Buxbaum ............................. 96/11 X |
| 6,048,383 | * | 4/2000 | Breault et al. ....................... 95/45 X |

FOREIGN PATENT DOCUMENTS

| | | | |
|---|---|---|---|
| 0276176 | * | 7/1988 | (EP) ........................................ 95/45 |
| 01-160803 | * | 6/1989 | (JP) ........................................ 95/56 |
| 02-229529 | * | 9/1990 | (JP) ........................................ 95/45 |

* cited by examiner

*Primary Examiner*—Robert H. Spitzer
(74) *Attorney, Agent, or Firm*—James Durkis; Virginia B. Caress; Paul A. Gottlieb

(57) ABSTRACT

The present invention is a bi-thermal membrane process for separating and recovering hydrogen isotopes from a fluid containing hydrogen isotopes, such as water and hydrogen gas. The process in accordance with the present invention provides counter-current cold and hot streams of the fluid separated with a thermally insulating and chemically transparent proton exchange membrane (PEM). The two streams exchange hydrogen isotopes through the membrane: the heavier isotopes migrate into the cold stream, while the lighter isotopes migrate into the hot stream. The heavy and light isotopes are continuously withdrawn from the cold and hot streams respectively.

18 Claims, 1 Drawing Sheet

METHOD AND APPARATUS FOR SEPARATION OF HEAVY AND TRITIATED WATER

The present invention was conceived and developed under a U.S. Government Contract No. DE-AC09-96SR18500 awarded by the U.S. Department of Energy. The Government has rights in this invention.

FIELD OF THE INVENTION

The present invention relates generally to a method and apparatus for separating and recovering hydrogen isotopes such as deuterium (D) and tritium (T) for the production of a deuterium and tritium-enriched water or hydrogen gas. More specifically, the present invention discloses the application of a proton exchange membrane (PEM) for separating and recovering heavy and light hydrogen isotopes. This method could be used, for example, for separating heavy water ($D_2O$ and DHO), tritiated heavy water (DTO) and super-heavy water ($T_2O$ and THO) from light water.

BACKGROUND OF THE INVENTION

At the present time, a number of various processes are available for separating and recovering deuterium and tritium, wherein deuterium (D) and tritium (T) refer to elemental hydrogen isotopes having either one or two additional neutrons respectively in a hydrogen nucleus.

A temperature exchange process is one of such processes that utilize isotope exchange reactions between the hydrogen compounds. The reactions utilize such an isotope effect that, for example, when water and hydrogen sulfide gas, each at the same deuterium concentration, are mixed together the deuterium concentration in water will become higher than that of the hydrogen sulfide gas in the equilibrium state.

Also known in the prior art is the use of a dual temperature isotope exchange system that separates and enriches hydrogen isotopes with higher efficiency. This process is basically a combination of two temperature exchange reactors, one at a low temperature and the other at a high temperature. The exchange reactions to be utilized in the dual temperature process include exchange reactions between water and hydrogen sulfide gas. The exchange reaction between water and hydrogen sulfide gas has an advantage that it avoids the necessity of the use of a catalyst in the reaction, but has a disadvantage in that the separation coefficient dependent upon chemical equilibrium is small.

The use of the catalyst substantially promotes an exchange reaction rate between water and hydrogen sulfide gas. For this reason, the development of a hydrophobic, highly efficient isotope exchange reaction catalyst has progressed greatly.

SUMMARY OF THE INVENTION

An object of the present invention is to provide a method for separating and recovering hydrogen isotopes that avoids the disadvantages of the prior art, is more simple, and allows for continuous hydrogen isotope separation and recovery.

The disclosed invention does not require the use of isotope exchange reaction catalysts and/or hydrogen sulfide gas. The present invention achieves the advantages of the thermal diffusion and the chemical exchange processes. The disclosed invention provides a method for separating and recovering hydrogen isotopes from a fluid containing the hydrogen isotopes by providing counter-current cold and hot streams of the fluid containing the hydrogen isotopes separated by a proton exchange membrane made of thermally insulating and chemically transparent material that allows exchange of heavy and light hydrogen isotopes therethrough. The heavier isotopes migrate to the cold stream producing a deuterium and tritium-enriched fluid, while lighter isotopes migrate to the hot stream producing a lighter isotope-enriched fluid. The heavy and light isotopes are withdrawn from the cold and hot streams respectively.

According to the present invention, the fluid is water or hydrogen gas, and the desired hydrogen isotope species are deuterium and/or tritium.

Further, according to the present invention, the streams of said high and low temperature fluids are interconnected at their respective top and bottom ends forming a continuous loop, and a feed stream is provided at an intermediate portion of either hot or cold stream to feed the process.

BRIEF DESCRIPTION OF THE DRAWINGS

Other objects and advantages of the invention will become apparent from a study of the following specification when viewed in light of the accompanying drawing, wherein.

DETAILED DESCRIPTION

Figure 1:
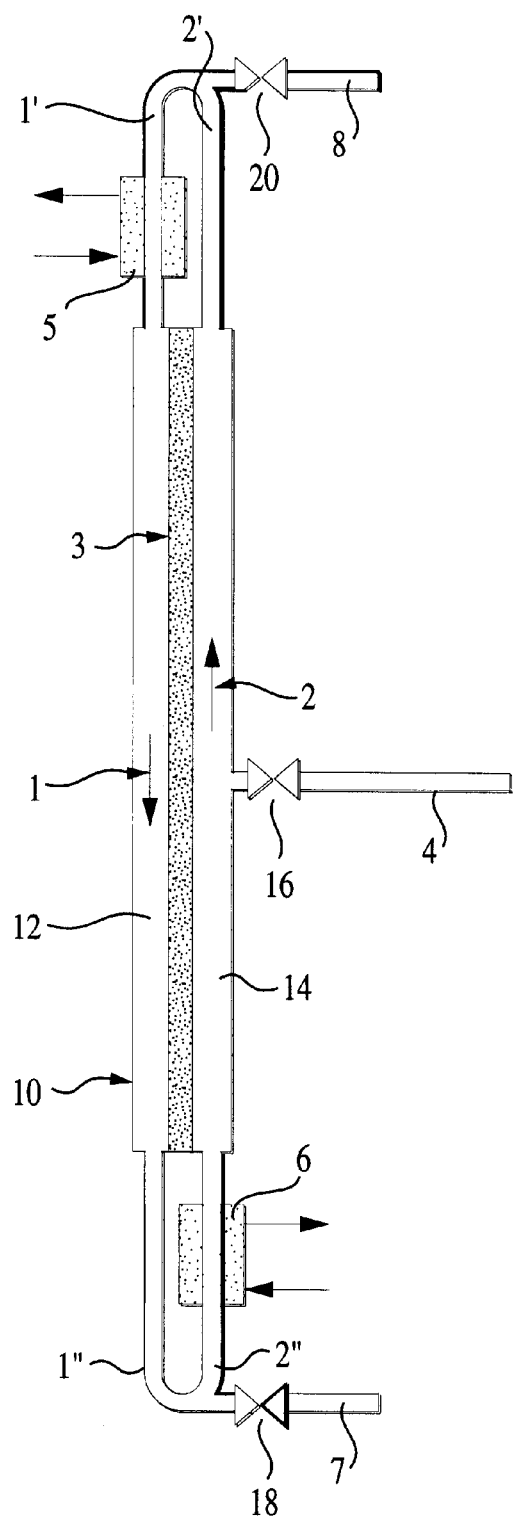
FIG. 1 is a schematic diagram illustrating the method and apparatus in accordance with the preferred embodiment of the present invention.

The present invention is a method for separating and recovering hydrogen isotopes from a fluid containing hydrogen isotopes, by using chemical exchange processes.

Referring to the preferred embodiment of the present invention illustrated in FIG. 1, cold and hot streams 1 and 2, respectively, of the same fluid containing hydrogen isotopes flow in a counter-current direction within a container 10 partitioned by a membrane 3 into a first chamber 12 and a second chamber 14. The cold stream 1 flows substantially vertically downwardly from a top end 1' of the cold stream 1 to its bottom end 1". At the same time, the hot stream 2 flows substantially vertically upwardly from a bottom end 2" of the hot stream 2 to its top end 2'. The cold and hot streams are connected to each other at their top and bottom ends forming a continuous loop.

The two streams 1 and 2 are in equilibrium through the proton exchange membrane (PEM) 3 that is made of thermally insulating but chemically transparent material. Thus the proton exchange membrane 3 permits the exchange of the hydrogen isotopes between cold and hot streams 1 and 2 respectively, and yet maintains the temperature difference between them. The heavier isotopes, such as deuterium and tritium, migrate to the cold stream 1, while the lighter isotopes migrate to the hot stream 2 through the proton exchange membrane 3 by chemical exchanges, providing continuous isotope separation process. The proton exchange membrane 3 employed in the present invention, is similar to those PEMs recently available on the market for fuel cell manufacturing, and is commonly known in the art.

The process operates in two modes: a reflux mode and a production mode. In the reflux mode, the cold and hot streams circle around closed loop. In a production mode a pipe 4 providing a feed stream is connected to one of the first chamber 12 or the second chamber 14 substantially at the middle portion thereof. A control valve 16 is provided in the pipe 4 for regulating the flow of the feed stream.

Furthermore, the cold stream 1 is provided with a device 5 for cooling the fluid in the cold stream 1, disposed substantially at the top end 1' of the cold stream 1. Correspondingly, the hot stream 2 is provided with a device 6 for heating the fluid in the hot stream 2, disposed substantially at the bottom end 2" of the hot stream 2.

As is evident from the foregoing, during the production mode the heavier isotopes, such as deuterium and tritium, migrate to the cold stream 1 from the hot stream 2, while the lighter isotopes migrate to the hot stream 2 from the cold stream 1 through the proton exchange membrane 3. Thus, the lower end 1" of the cold stream 1 becomes enriched with deuterium and tritium isotopes, and the deuterium and tritium enriched fluid is withdrawn as a product from the cold stream at the bottom end 1" thereof through a product withdraw pipe 7 provided with a control valve 18 for regulating a product withdraw stream. Respectively, the top end 2' of the hot stream 2 becomes enriched with lighter isotopes, and the lighter isotope enriched fluid is withdrawn as a raffinate from the hot stream at the top end 2' thereof through a raffinate withdraw pipe 8 provided with a control valve 20 for regulating a raffinate withdraw stream.

According to the preferred embodiment of the present invention, the fluid containing hydrogen isotopes, is water or hydrogen gas.

The specific material of the proton exchange membrane 3 depends on the type of fluid used for isotope separating and recovering. If, for example, the fluid is water, a membrane made of Nafion™, a perfluorinated ion exchange polymer, could be employed. The Nafion™ membranes allow hydroquninone carrying water molecules to pass through. Furthermore, the Nafion™ is a good thermal insulating material. Therefore, when using Nafion™ as the PEM, the heavy isotopes D and T can be separated from the water. The Separation factor, $([HDO]/[H_2O])cold/([HDO]/[H_2O])hot$, of the Nafion™ membrane at a temperature of 25° C. for the cold water stream and 65° C. for the hot water stream is 1.6.The use of the Nefion™ membrane is particularly beneficial for tritium removal from tritiated water.

If the fluid is hydrogen gas, a palladium membrane coated with Teflon™ (a fluoropolymer) or silicate may be employed. Teflon™ (or silicate) coating provides a good thermal insulation and, at the same time, allows hydrogen molecules to pass through. Therefore, this composite membrane can be used to separate the hydrogen isotopes from hydrogen gas. The separation factor, $([HT]/[H_2])cold/([HT]/[H_2])hot$, of the palladium composite membrane at a temperature of 20° C. for the cold gas stream and 100° C. for the hot as stream is 1.94.

As may be seen, the disclosed method for separating and recovering hydrogen isotopes from water or hydrogen gas using the proton exchange membrane separating the hot and cold streams demonstrates an improvement over the prior art and provides simple and efficient method that requires neither pretreatment of the isotopic water nor the use of the isotope exchange catalysts and/or hydrogen sulfide gas.

While the preferred embodiments of the present invention have been illustrated and described, it will be apparent to those of ordinary skill in the art that various changes, modifications or variations may be easily made without deviating from the scope of the invention.

What is claimed is:

1. A method for separating and recovering hydrogen isotopes from a fluid containing hydrogen isotopes, said method comprising the steps of:

(a) communicating a first stream of a fluid containing hydrogen isotopes at a first temperature in a first direction between a first end and a second end;

(b) communicating a second stream of said fluid containing hydrogen isotopes at a second temperature lower than the first temperature in a second direction opposite to the first direction between said second end and said first end;

(c) interposing a proton exchange membrane between the streams, said proton exchange membrane being made of thermally insulating and chemically transparent material that allows exchange of heavy and light hydrogen isotopes therethrough, wherein heavier isotopes migrate from the first stream to the second stream for thereby producing a deuterium and tritium-enriched fluid, while lighter isotopes migrate to the first stream from the second stream for thereby producing a lighter isotope-enriched fluid;

(d) removing the deuterium and tritium-enriched fluid from the first end, and (e) removing the lighter isotope-enriched fluid from the second end.

2. The method for separating and recovering hydrogen isotopes, as defined in claim 1, wherein said first and second streams are interconnected at their respective ends forming one continuous loop.

3. The method for separating and recovering hydrogen isotopes, as defined in claim 2, further comprising the step of providing a feed stream of said fluid containing hydrogen isotopes.

4. The method for separating and recovering hydrogen isotopes, as defined in claim 2, comprising the steps of:

providing a means for heating said first stream disposed substantially at said first end thereof, and providing a means for cooling said second stream disposed substantially at said second end thereof.

5. The method for separating and recovering hydrogen isotopes, as defined in claim 1, wherein the fluid containing hydrogen isotopes is water.

6. The method for separating and recovering hydrogen isotopes, as defined in claim 5, wherein the proton exchange membrane is manufactured of a perfluorinated ion exchange polymer.

7. The method for separating and recovering hydrogen isotopes, as defined in claim 6, wherein the first temperature is 65 to 80° C. and the second temperature is 15 to 30° C.

8. The method for separating and recovering hydrogen isotopes, as defined in claim 1, wherein the fluid containing hydrogen isotopes is hydrogen gas.

9. The method for separating and recovering hydrogen isotopes, as defined in claim 8, wherein the proton exchange membrane is manufactured of palladium coated with one of silicate or a fluoropolymer.

10. The method for separating and recovering hydrogen isotopes, as defined in claim 9, wherein the first temperature is 90–150° C. and the second temperature is −15 to +35° C.

11. An apparatus for separating and recovering hydrogen isotopes from a fluid containing hydrogen isotopes, said apparatus comprising:

a container;

a proton exchange membrane disposed within said container and dividing said container into a first chamber for containing a first stream of said fluid containing hydrogen isotopes at a first temperature and a second chamber containing a second stream of said fluid containing hydrogen isotopes at a second temperature, the first and second streams being interconnected at their respective ends for forming a continuous loop within said container;

said proton exchange membrane being made of thermally insulating and chemically transparent material that allows exchange of heavy and light hydrogen isotopes therethrough, wherein heavier isotopes migrate from the first stream to the second stream for thereby producing a deuterium and tritium-enriched fluid, while lighter isotopes migrate to the first stream from the second stream for thereby producing a lighter isotope-enriched fluid.

12. The apparatus for separating and recovering hydrogen isotopes, as defined in claim 11, further comprising a means for providing a feed stream of said fluid containing hydrogen isotopes.

13. The apparatus for separating and recovering hydrogen isotopes, as defined in claim 11, further comprising a means for heating the first stream.

14. The apparatus for separating and recovering hydrogen isotopes, as defined in claim 11, further comprising a means for cooling the second stream.

15. The apparatus for separating and recovering hydrogen isotopes, as defined in claim 11, further comprising a means for removing the deuterium and tritium-enriched fluid from the second stream.

16. The apparatus for separating and recovering hydrogen isotopes, as defined in claim 11, further comprising a means for removing the lighter isotope-enriched fluid from the first stream.

17. The apparatus for separating and recovering hydrogen isotopes, as defined in claim 11, wherein said proton exchange membrane is manufactured of a perfluorinated ion exchange polymer.

18. The apparatus for separating and recovering hydrogen isotopes, as defined in claim 11, wherein said proton exchange membrane is manufactured of palladium coated with one of silicate or a fluoropolymer.

* * * * *